United States Patent [19]
Goldie

[11] 4,001,829
[45] Jan. 4, 1977

[54] HIGH AVERAGE POWER MILLIMETER DUPLEXER

[75] Inventor: Harry Goldie, Randallstown, Md.

[73] Assignee: The United States of America as represented by the Secretary of the Air Force, Washington, D.C.

[22] Filed: Aug. 18, 1975

[21] Appl. No.: 606,040

[52] U.S. Cl. .................................. 343/180; 315/39; 325/24; 333/13; 333/98 S; 333/99 PL
[51] Int. Cl.² .................................... H04B 1/44
[58] Field of Search ......... 333/10, 13, 98 S, 99 PL; 325/24; 343/175, 180; 315/39

[56] References Cited
UNITED STATES PATENTS

| 2,586,993 | 2/1952 | Riblet | 333/13 X |
| 3,480,828 | 11/1969 | Goldie | 333/13 X |

Primary Examiner—Paul L. Gensler
Attorney, Agent, or Firm—Joseph E. Rusz; George Fine

[57] ABSTRACT

A high power duplexer in the millimeter region includes a beam excited plasma switch in combination with colinear waveguide transmission lines. The beam passes through four sets of slots which are positioned in the four narrow adjoining walls of the colinear waveguide transmission lines. A quasi-anode is used to aid in turn-on of the plasma switch.

2 Claims, 1 Drawing Figure

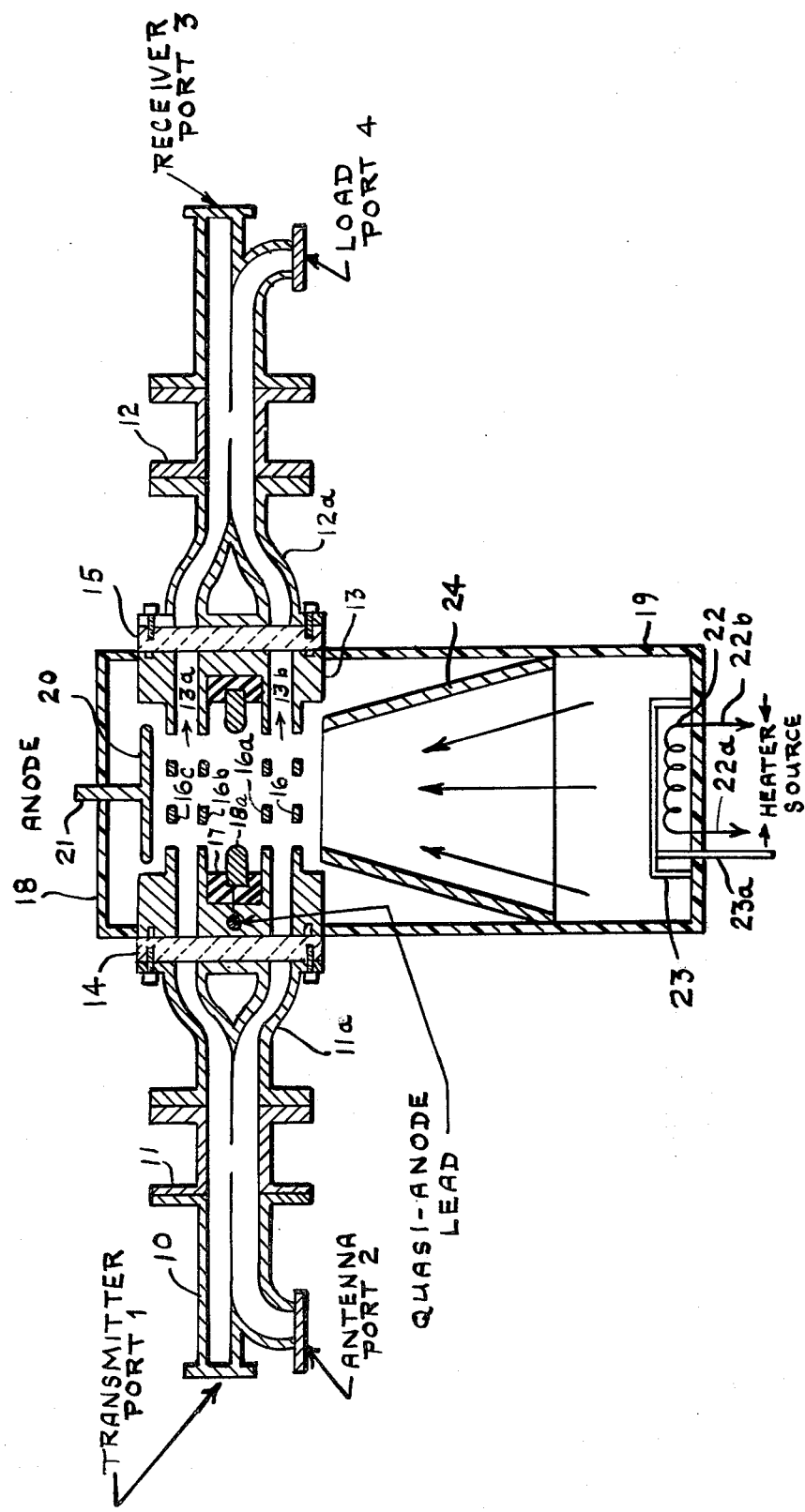

HIGH AVERAGE POWER MILLIMETER DUPLEXER

STATEMENT OF GOVERNMENT INTEREST

The invention described herein may be manufactured and used by or for the Government for governmental purposes without the payment of any royalty thereon.

BACKGROUND OF THE INVENTION

At the present time, there is no device available which can duplex millimeter wave radars which operate at hundreds of watts of average power levels, not only in the 60 to 96 GHz bands, but at other microwave and submillimeter wave frequency regions as well. The present invention provides apparatus for duplexing such high average power levels, not only in the 60 to 96 GHz bands, but at other microwave and submillimeter wave frequency regions as well.

In the prior art, a duplexer utilized a pair of thyratron waveguide switches (TWS) located between a pair of short-slot hybrids as shown and described in an article entitled, "S-BAND THYRATRON WAVEGUIDE SWITCH AS A PRETRIGGERED MEGAWATT DUPLEXER," by Harry Goldie, published August, 1968 in The Microwave Journal. The present duplexer uses a common thyratron waveguide switch in combination with a colinear waveguide transmission line. The colinear waveguide transmission line includes a pair of short slot hybrids to form a conventional balanced four-port circuit configuration. The single beam technique provided by the common thyratron waveguide switch conserves drive power and reduces mechanical complexity since only one cathode and one convergence cone is required.

SUMMARY OF THE INVENTION

A high average power duplexer at millimeter waves is provided. A beam excited plasma switch is used in combination with a colinear transmission line. A single electron beam created by conventional gas discharge excitation techniques is passed through a convergence cone to increase the electron density in the plasma by a factor of ten. The beam passes through four sets of slots (grids) which are cut into four narrow walls of the waveguide transmission line. A quasi-anode is used to aid in turn-on. The colinear transmission line also includes a pair of short slot hybrids to form a conventional balanced four-port circuit configuration.

DESCRIPTION OF THE DRAWING

The single FIGURE shows the preferred embodiment of the duplexer including a single beam excited plasma switch having colinear transmission lines.

DETAILED DESCRIPTION OF THE PREFERRED EMBODIMENT

Now referring in detail to the single FIGURE, there is shown duplexer 10 having short slot hybrids 11 and 12 which are utilized in forming a balanced four-port circuit configuration. The four-ports are transmitter port 1, antenna port 2, receiver port 3, and load port 4.

Dual waveguide body 13 includes rectangular waveguides 13a and 13b in a parallel colinear relationship. Pressure windows 14 and 15 are made of halfwave beryllia oxide ceramic. The windows serve to partition off waveguides 13a and 13b. Transitional waveguide 11a interconnects short slot hybrid 11 to dual waveguide body 13 but interposed and fastened therebetween is window 14 thus sealing waveguides 13a and 13b at one end thereof. Transitional waveguide 12a interconnects short slot hybrid 12 to dual waveguide body 13 but interposed and fastened therebetween is window 15 thus sealing waveguides 13a and 13b the other end thereof. Transitional waveguides 11a and 12a are conventional in that they provide a change of dimensions in a conventional manner. They are also commonly known as adapters.

Four sets of slots are cut into the four narrow walls of the waveguide transmission line to provide four grids 16, 16a, 16b, and 16c, as a control electrode. Insulating material 17 is pressure fitted into dual waveguide body 13 and metallic quasi-anode electrode 18a is pressure fitted therein.

Housings 18 and 19 are attached to and integrated with dual waveguide body 13 and are also airtight sealed thereto. They serve as insulating envelopes. In housing 18 there is positioned anode 20 which is connected to anode lead 21. Anode lead 21 is airtight sealed with housing 18. Housing 19 has disposed therein heater 22 having airtight sealed leads 22a and 22b. Also included in housing 19 is cathode 23 having airtight sealed lead 23a. Cathode 23 constitutes an extended source of free electrons. Convergence cone 24 is also positioned affixed in housing 19. The means for affixing cone 24 is not shown but any conventional method may be utilized. The portion of the waveguides 13a and 13b between windows 14 and 15 and housings 18 and 19 comprise the envelope for the plasma waveguide switch. The envelope includes therein an appropriate ionizable gas fill.

In the operation of the beam excited plasma switch tube of the present invention, the triggering thereof is conventional and may be of the type described in U.S. Pat. No. 3,480,828 issued Nov. 25, 1969, entitled "THYRATRON WAVEGUIDE SWITCH WITH DENSITY ENHANCEMENT FOR OPERATION IN 27 TO 40 GHz RANGE", by H. Goldie.

It is emphasized that a single beam created by conventional gas discharge excitation techniques is passed through convergence cone 24 to increase the electron density in the plasma by a factor of 10. The beam passes through four sets of slots (grids) 16, 16a, 16b, and 16c, which have been cut into the four narrow walls of waveguides 13a and 13b. Quasi-anode electrode 18a is used to aid in turn-on at the time of the aforementioned triggering since main anode 20 is overly baffled from convergence cone 24 by the four grids. With two sets of grids, it has been demonstrated an effective turn-on switching at 96 GHz with single transmission line losses of 0.8 db.

The use of half wave beryllia oxide ceramic windows allow high power discharges against the input window without material degradations for long pulse durations and high duty rates. The use of BeO windows also provides for complete metallic-ceramic structure leading to the advantageous processing techniques well known to high average power RF tubes such as TWT's, klystrons, etc.

The use of common beam and common gasfill for both transmission line bodies reduces the electrical differences between the two halves; especially important in minimizing the time difference for the RF attenuation increase (occurs in 1–4 ns) when an intense wavefront is incident. The use of the short slot hybrids to form the balanced four-port configuration is conventional. It is considered that the aforementioned adapters (transitional waveguides) may be eliminated by appropriate window design. The single beam technique conserves drive power and reduces mechanical complexity since only one cathode and one convergence cone is required.

In the operation of the duplexer, the power from the transmitter enters port 1, the thyratron waveguide switch is triggered approximately prior to this to provide a plasma discharge and the power is thereupon reflected back to the transmitting antenna by way of antenna port 2. Upon the cessation of the triggering and plasma discharge, the reflected signal reflecting from the transmission is received at antenna port 2 and passes through to receiver port 3.

What is claimed is:

1. A high average power duplexer at millimeter wavelengths comprised of a single thyratron waveguide switch having a cathode electrode, a first anode electrode, and a grid control electrode, said grid control electrode being in the form of first and second hollow sections of first and second waveguides, respectively, said first and second waveguides being in a parallel and colinear relationship and interposed between said cathode electrode and said first anode electrode and each section having perforated sidewalls to permit the flow of electrons from said cathode electrode to said first anode electrode across said waveguide sections, said sections of waveguides being sealed into an envelope structure encompassing all of said electrodes and including first and second pressure windows closing said hollow first and second waveguides on points on either side of the perforated portions of said walls to complete said envelope, an ionizable gas in said envelope, said cathode electrode constituting an extended source of free electrons to provide a single beam, a convergence cone for increasing the density of said electrons in said waveguide sections relative to the density of said electrons at their source, said convergence cone positioned between said cathode electrode and said grid control electrode, a second anode electrode interposed between said first and second waveguides to aid in turn-on, first and second short slot hybrids forming a balanced four-port configuration, said first short slot hybrid being electrically connected to said first and second waveguides by way of said first window, and said second short slot hybrid being connected to said first and second waveguides by way of said second window, a transmitter port and an antenna port connected to said first short slot hybrid, and a receiver port and a load port connected to said second short slot hybrid.

2. A high average power duplexer as described in claim 1 wherein said first and second windows consist of half wave beryllia oxide ceramic.

* * * * *